(12) United States Patent
Forster

(10) Patent No.: US 9,342,775 B2
(45) Date of Patent: May 17, 2016

(54) DUAL MODE CHIP HAVING RADIO FREQUENCY IDENTIFICATION AND ELECTRONIC ARTICLE SURVEILLANCE CAPABILITY

(75) Inventor: Ian James Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 179 days.

(21) Appl. No.: 13/286,477

(22) Filed: Nov. 1, 2011

(65) Prior Publication Data

US 2013/0105584 A1 May 2, 2013

(51) Int. Cl.
*G06K 19/07* (2006.01)

(52) U.S. Cl.
CPC ........ *G06K 19/0723* (2013.01); *G06K 19/0726* (2013.01)

(58) Field of Classification Search
CPC ............ G06K 7/0008; G06K 7/10316; G06K 7/10336; G06K 19/07749; G06K 19/0723; G06K 19/0726; G06K 19/07345; G06K 19/07718; G08B 13/2408; G08B 13/2417; G08B 13/2477; G08B 13/2488; H01Q 1/22; H01Q 1/2216; H01Q 1/2225
USPC ............. 340/572.1, 572.7, 10.1, 568.1, 572.5
See application file for complete search history.

(56) References Cited

U.S. PATENT DOCUMENTS

| | | | |
|---|---|---|---|
| 7,152,804 B1 | 12/2006 | MacKenzie et al. | |
| 7,642,915 B2 | 1/2010 | Eckstein | |
| 2005/0253763 A1* | 11/2005 | Werner et al. | 343/745 |
| 2008/0088417 A1 | 4/2008 | Smith et al. | |
| 2008/0143519 A1* | 6/2008 | Piotrowski | 340/540 |
| 2008/0278887 A1* | 11/2008 | Zelner et al. | 361/313 |
| 2010/0001079 A1* | 1/2010 | Martin et al. | 235/492 |
| 2010/0060456 A1* | 3/2010 | Forster | 340/572.7 |
| 2010/0141452 A1 | 6/2010 | Lian et al. | |
| 2010/0231362 A1 | 9/2010 | Smith et al. | |

FOREIGN PATENT DOCUMENTS

| | | |
|---|---|---|
| WO | 2006057888 | 6/2006 |
| WO | 2008045570 | 4/2008 |

OTHER PUBLICATIONS

International Search Report dated Feb. 28, 2013 for International Application No. PCT/US2012/062535 filed Oct. 30, 2012.

(Continued)

*Primary Examiner* — Sonji Johnson
(74) *Attorney, Agent, or Firm* — Avery Dennison Retail Information Services LLC

(57) ABSTRACT

A dual mode detection device provides both radio frequency identification and electronic article surveillance functionality. The device includes a dual mode microchip including a logic circuit and a non-volatile memory, the dual mode microchip having an electronic article surveillance (EAS) capability and a radio frequency identification (RFID) capability. An antenna is operatively coupled to the microchip for operation of the RFID capability. A coil is operatively coupled to the microchip and a capacitor is integrated into the microchip such that the coil resonates at a specific frequency, wherein exceeding a breakdown voltage of the capacitor alters a state of a memory location in the non-volatile memory.

22 Claims, 7 Drawing Sheets

(56) References Cited

OTHER PUBLICATIONS

Written Opinion dated Feb. 28, 2013 for International Application No. PCT/US2012/062535 filed Oct. 30, 2012.

International Preliminary Report on Patentability dated May 6, 2014 for International Application No. PCT/US2012/062535 filed Oct. 30, 2012.

* cited by examiner

DUAL MODE CHIP HAVING RADIO FREQUENCY IDENTIFICATION AND ELECTRONIC ARTICLE SURVEILLANCE CAPABILITY

TECHNICAL FIELD

Embodiments of the invention relate generally to electronic article surveillance using radio frequency identification technology. More specifically, the embodiments relate to radio frequency identification and electronic article surveillance tags.

BACKGROUND OF THE INVENTION

Electronic article surveillance (EAS) technology is a widely used method for preventing shoplifting from retail and other stores. EAS technology is used to identify articles as they pass through a gated area in a store. In practice, an EAS tag or label is attached to an article. The tag is deactivated so that it will not flag an alarm. If the tag is a hard, reusable tag, a detacher is used to remove it when a customer purchases the tagged item. If the tag is disposable, it can be deactivated by swiping the article over a pad or with a handheld scanner.

Radio frequency identification (RFID) systems are used world-wide. A tag or label attached to a product responds to a specific frequency emitted by a transmitter antenna. The response from the RFID tag is picked up by a receiver antenna. This processes the tag response signal and triggers an alarm when specific criteria are matched. RFID EAS tags are essentially an LC circuit having a resonance peak frequency between about 2 MHz and about 10 MHz. The most popular frequency is 8.2 MHz. The 8.2 MHz tag is deactivated by subjecting the tag to a strong magnetic field at the resonant frequency to induce voltage exceeding the breakdown voltage and detune the circuit by partially destroying the capacitor.

Currently, high frequency (HF) EAS tags require a parallel plate capacitor to be made to resonate the coil at 8.2 MHz. In addition, the coil must have a defined breakdown voltage to allow the device to be deactivated by exposing it to high field strength.

SUMMARY OF THE INVENTION

Embodiments of the invention relate to a method for making dual mode ultra high frequency (UHF) and HF EAS tags, leveraging the ability to make low cost coils in a process that is compatible with making a high performance UHF antenna. In one embodiment, the novel chip has a plurality of connection ports, including a first connection port for an UHF antenna, and a second connection port for a low frequency coil structure. A capacitor is provided internally to the chip in order to resonate the coil. A control switch can be used such that the EAS function can be deactivated both on command and by the normal method of applying high field strength. If the control switch is omitted, the capacitor in the chip may have a defined breakdown voltage, enabling normal deactivation. Optionally, the breakdown of the capacitor can be made to damage or disconnect an area of memory so that the deactivation status can be confirmed by reading a memory state via the UHF RFID interface. In another embodiment, the UHF RFID and EAS functions share connections, with the shunt capacitor inside the chip connected via an inductor at UHF frequencies to allow connection to an UHF antenna.

In an exemplary embodiment, a dual mode detection device provides both radio frequency identification and electronic article surveillance functionality. The device includes a dual mode microchip including a logic circuit and a non-volatile memory, the dual mode microchip having an electronic article surveillance (EAS) capability and a radio frequency identification (RFID) capability. An antenna is operatively coupled to the microchip for operation of the RFID capability. A coil is operatively coupled to the microchip and a capacitor is integrated into the microchip such that the coil resonates at a specific frequency wherein exceeding a breakdown voltage of the capacitor alters a state of a memory location in the non-volatile memory.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

Figure 1:
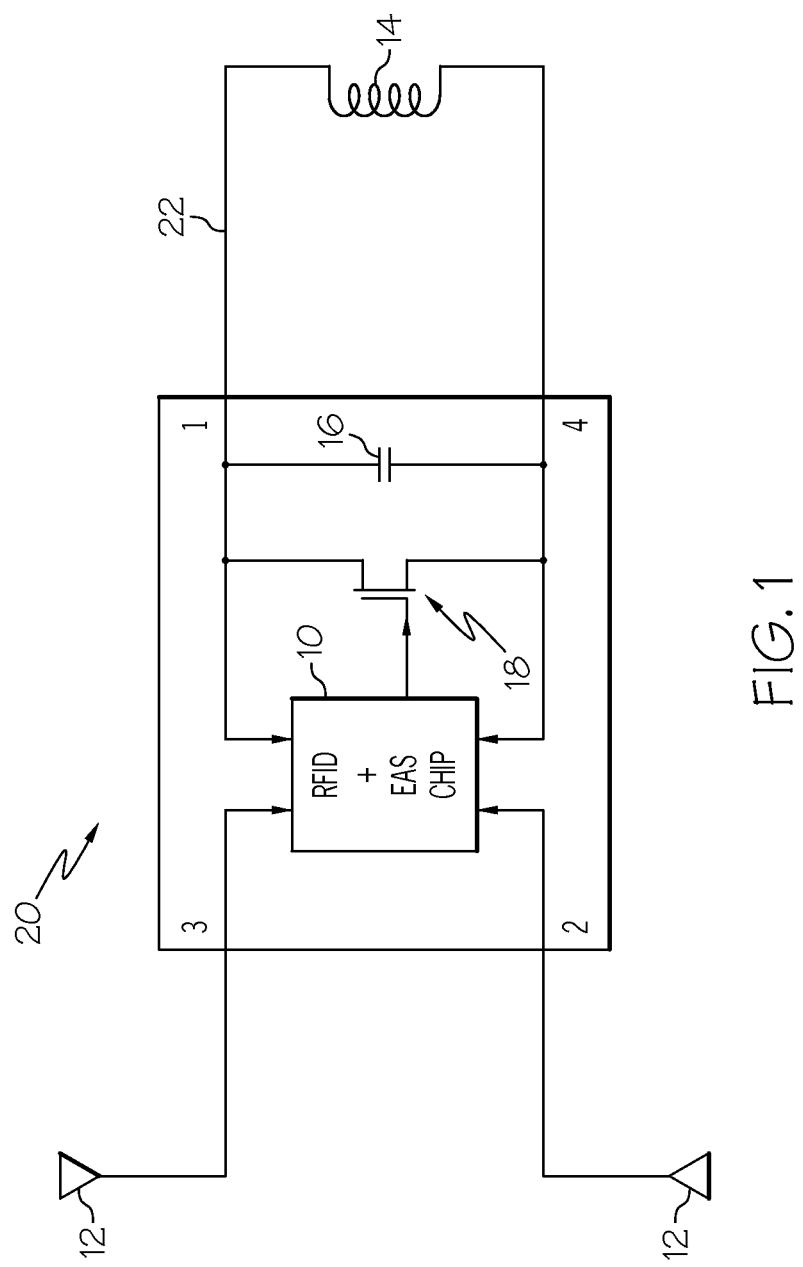
FIG. 1 illustrates the basic structure of a dual mode RFID/EAS chip in an exemplary embodiment.

The following description is provided as an enabling teaching of embodiments of the invention including the best, currently known embodiment. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the invention and not in limitation thereof, since the scope of the invention is defined by the claims.

Embodiments disclosed herein include a novel chip that is capable of enabling, with a suitable conductive structure, REID reading at a relatively high frequency, for example 800-1000 MHz, and an EAS function at a relatively low frequency, such as 8.2 MHz. Unlike EAS devices operating at lower frequencies, UHF RFID devices do not normally operate as a simple resonator.

It is important for retailers to have means to identify products for stock control and logistics, as well as having anti-theft features, frequently described as Electronic Article Surveillance (EAS). It would be desirable to incorporate RFID and EAS technologies into a single structure to reduce cost; however certain features of EAS technology make this difficult. For example, for the HF EAS solution which requires a resonator at approximately 8.2 MHz, a capacitor to resonate the coil must be provided as well as a method of deactivating the device, which is normally achieved by placing the device into a strong 8.2 MHz magnetic field such that a high voltage is generated across the capacitor causing it to change its characteristics.

In the disclosed embodiments, a chip combining functions required to make an RFID tag as well as an EAS device are described, along with ways in which the two technologies can interact such that enhanced features and flexibility are provided to the user/customer.

In exemplary embodiments, the chip includes some or all the following components:
1. an input for connection of a UHF antenna allowing reception and backscatter of data carrying signals to and from a suitable reader system;
2. an input for connection of a coil;
3. a capacitor integrated into the chip that resonates a coil at the desired frequency, for example, 8.2 MHz, and optionally has a defined breakdown voltage;
4. the capacitor described above wherein the breakdown of the capacitor changes the state of memory locations in the chip that can be accessed by the UHF RFID circuit;
5. a switch having a non-volatile state that affects the resonant condition of the coil such that is either detected or not detected by an EAS gate;
6. a logic circuit containing non-volatile memory that retains the state of the EAS function;
7. a level detector on the coil input that can, via the internal logic, set the state of the EAS function; and
8. a rectifier circuit that can derive power for operation of the chip from the UHF input signal or both the UHF signal and the signal present across the coil.

FIG. 1 illustrates the basic structure of device 20 including a dual mode chip 10 having four connection points, labeled 1-4. Connections 2 and 3 are used for an UHF far field or near field antenna 12, and connections 1 and 4 are used for connection of a coil 14 designed to resonate with the internal capacitor 16. A control switch 18, shown as a transistor, is connected across the capacitor 16, such that when the switch 18 is relatively open circuit the resonant circuit (14, 16) would function as an 8.2 MHz EAS device, and when it is relatively short circuit the EAS function would be inhibited. Optionally, in the short circuit state the switch 18 will clamp the voltage to a low level, sufficient to operate the logic circuits of the device, but with a low enough level of energy adsorption at 8.2 MHz such that the device 20 will not trigger an EAS alarm at a gate.

A connection 22 to the chip 10 from the coil 14 allows power to run the logic circuit to be derived from the 8.2 MHz signal detected by the coil 14. In addition, the level of the signal present can be detected. The chip 10 has two EAS states: enabled and disabled. The change between states can be managed in a number of ways.

Via the UHF RFID interface. A non-volatile memory bit can be set to either enabled or disabled by command from a reader system. Optionally, the ability to the change the state may require a password or other token.

Via the HF EAS interface. The state of the memory bit can be set by the level of signal across the coil 14 exceeding a defined threshold, for example 100 volts. This level would be associated with the device 20 being placed in proximity to a standard HF EAS deactivator.

When in the disabled state, the voltage across the coil 14 rises until the internal rectifier and charge pump of the chip 10 increase to a level that allows it to bias the switch 18, thereby disabling the LAS detection function.

Optionally, the default state for the switch 18 can be disabled, and can only be enabled when the device 20 is needed for EAS functions. This allows the capacitor 16 to be protected against over voltage during manufacture, such as electrostatic discharge, and only enabled when it is protected.

In an alternative embodiment, the bias for the switch 18 is provided by a capacitor (not shown) formed on the gate region of the transistor such that its conductivity is independent of the voltage applied.

Figure 2:
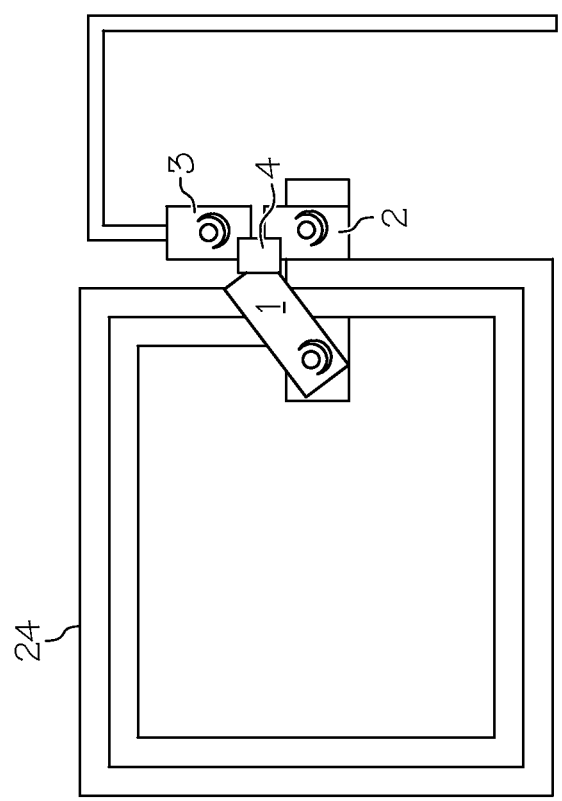
FIG. 2 illustrates a structure combining a coil with an UHF antenna in an exemplary embodiment.

FIG. 2 shows a simple structure 24 combining a coil and a UHF antenna in one embodiment. In this embodiment, the chip is attached to a strap which is then connected to an antenna 24 consisting of a coil section and a dipole section, formed on a common substrate. Alternatively to a strap, a direct chip attachment, using a method such as flip chip or wire bonding could be used with a suitable coil and antenna structure. Although a dipole structure is shown, a number of alternate UHF antenna structures could be utilized, such as slot antennas, loop antennas, or a combination thereof.

Figure 3:
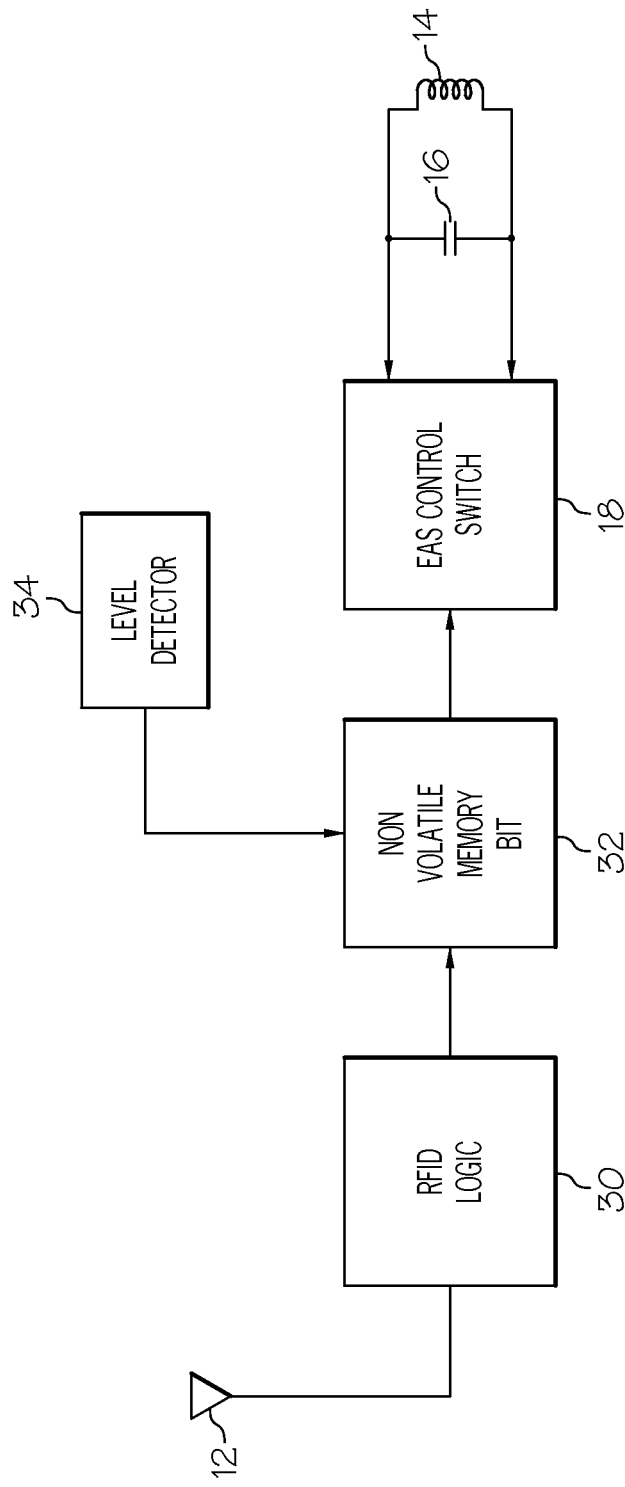
FIG. 3 illustrates how the EAS control switch can be set by different mechanisms.

FIG. 3 illustrates an embodiment having further details of how the EAS control switch 18 can be managed by both commands via the UHF interface and features of the signal can be detected on the other input such as signal level or frequency. The capacitor 16 resonates the coil 14 at a desired frequency such as 8.2 MHz. EAS control switch 18 with a non-volatile state affects the resonant condition of the coil 14 such that it is either detected or not detected by an EAS gate. RFID logic circuit 30 contains non-volatile memory that retains the state of the EAS function in a non-volatile memory bit 32. The level detector 34 on the coil input can set the state (enabled, disabled) of the EAS function via internal RFID logic 30.

Figure 4:
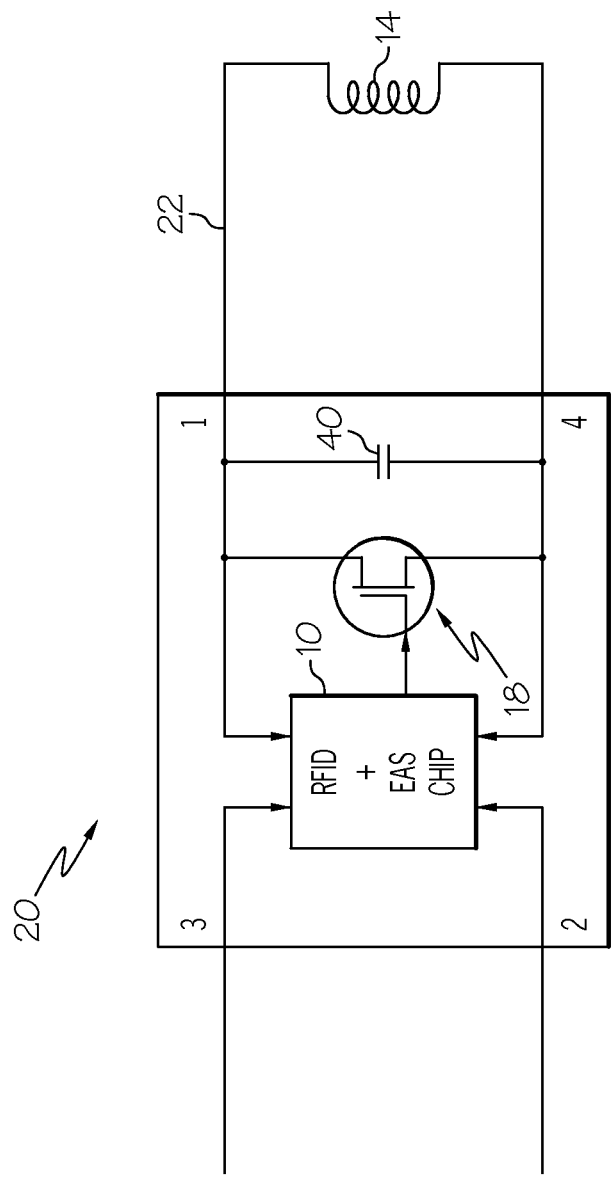
FIG. 4 illustrates the use of a capacitor fabricated from ferromagnetic dielectric material in an exemplary embodiment.

FIG. 4 illustrates an embodiment using a capacitor 40 consisting of a ferroelectric dielectric material, which can have two separate states of capacitance. The state of the capacitor 40 can be controlled via the RFID interface or by the signal applied.

Figure 5:
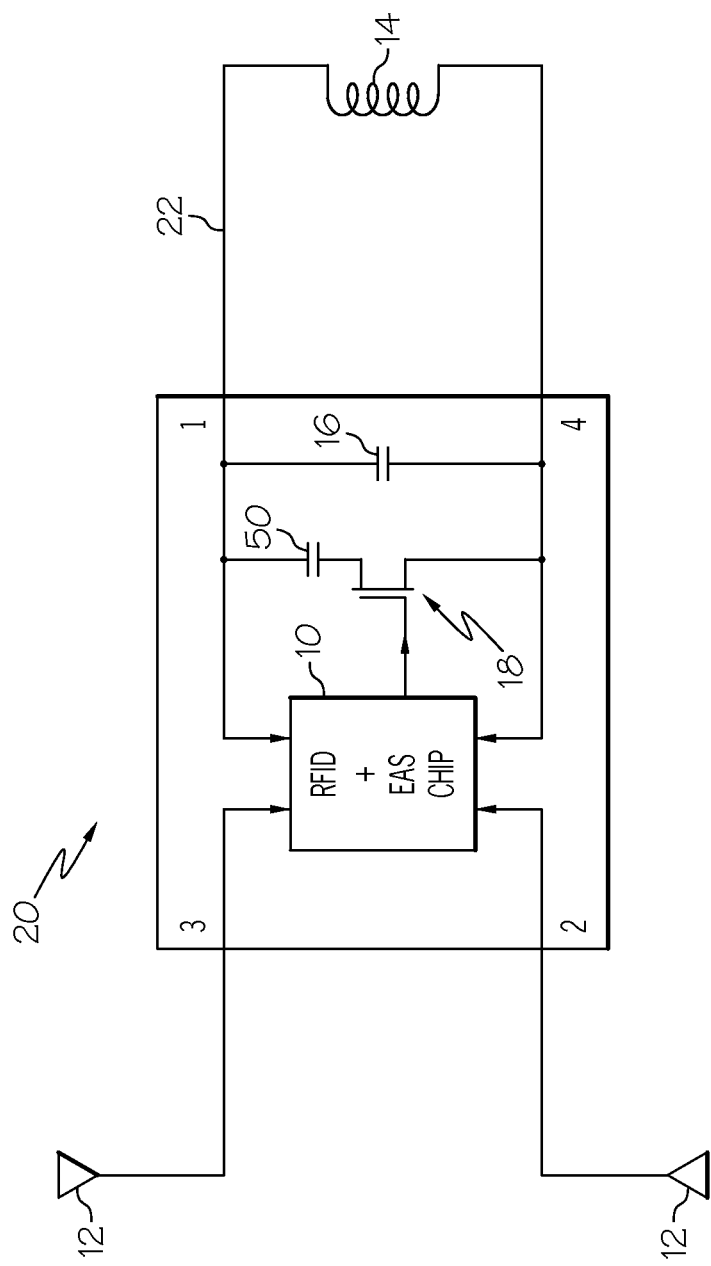
FIG. 5 illustrates an exemplary embodiment using an additional switchable capacitor to change the resonant frequency.

FIG. 5 shows a further embodiment wherein the EAS control switch 18 changes the capacitance, and hence the operating frequency of the coil 14 and capacitor combination. A second capacitor 50 is added to the detection device to change the resonant frequency of the coil For example, the resonant frequency of the coil 14 and chip capacitance when the switch 18 is off may be 8.2 MHz, detectable by an EAS gate, and may change to 4.1 MHz, not detectable by an EAS gate, when the switch 18 is on.

Figure 6:
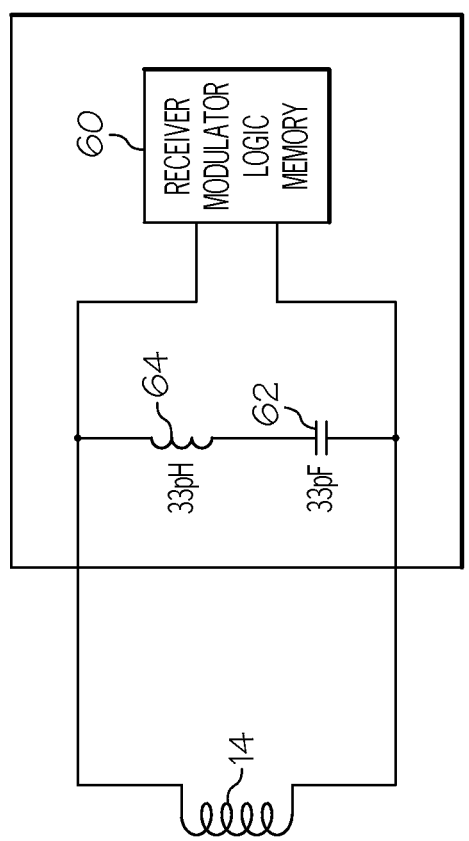
FIG. 6 illustrates a structure functioning both as a coil and an UHF antenna in an exemplary embodiment.

In FIG. 6 an alternate arrangement is shown, where the UHF RFID functions and HF EAS functions can be accommodated on a single pair of contacts to the chip. The chip includes both an internal capacitor 62 and inductor 64 in a series combination, which, in the exemplary embodiment, would have a resonant frequency in the region of 152.5 MHz. As is known in the art, below the resonance frequency, the series combination looks capacitive, and above resonance inductive. At 8.2 MHz, the 33 nH inductor 64 has a reactance of 1.7 ohms, whereupon the capacitor 62 has a reactance of 588 ohms, and the capacitive reactance dominates. At 915 MHz, a common UHF RFID frequency, the 33 nH inductor 64 has a reactance ~190 ohms, and the capacitor 62 only 5.3 ohms, and the inductive reactance dominates. This allows the RFID chip to effectively have two very different impedances at the two frequencies; at 8.2 MHz, it behaves as a capacitor, and resonates with a coil structure 14, and at UHF it looks inductive, making it possible for the RFID chip to achieve a substantially conjugate match to a UHF antenna mode associated with the same structure as the coil 14.

Internally the RFID chip contains a switch, capable of modifying the behavior of the both the HF resonance, which functions as an EAS mode, and creating modulated backscatter at UHF frequencies in conjunction with the antenna for performing UHF RFID functions.

Figure 7:
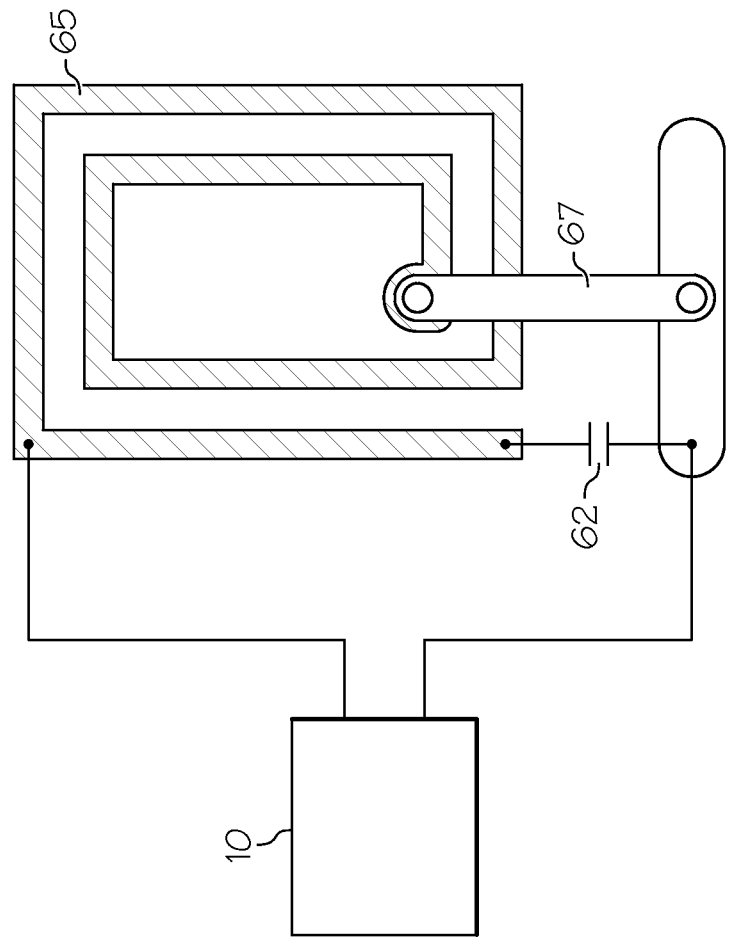
FIG. 7 illustrates an alternate construction for an EAS UHF RFID tag where the capacitor is external to the RFID chip.

FIG. 7 shows an alternate construction for an EAS UHF RFID tag where the capacitor 62 is external to the RFID chip 10. Again, only two connections are required to the chip, but they are placed at points in the dual mode antenna structure 65 that gives a substantial inductance at UHF between the points, isolating the UHF input from the high capacitance needed to resonate the coil. The capacitor structure 62 resonates with coil 14 via UHF inductive section. A bridge or strap 67 can be used to connect the antenna structure 65.

An additional feature of the chip design shown in FIG. 1 is that, by rectifying power from the coil connection, the UHF RFID circuit 20 may operate at much lower UHF signal strengths than would normally be achieved. FIG. 6 illustrates a circuit that can derive power for operation of the chip from the UHF input signal or both the UHF signal and the signal present across the coil 14. The structure functions as both coil 14 and UHF antenna. The internal inductor 64 dominates at UHF frequencies allowing the UHF antenna to match to the chip 10. The low frequency capacitor 62 dominates at HF frequencies. As an enabled device 20 approaches the store exit, the signal strength on the coil 14 will rise, enabling the UHF RFID device 20 and making it possible for it to communicate with a reader at the exit gate, giving the identity of the product. As power is being provided by a low frequency signal, the chip 10 is able to respond with greatly enhanced sensitivity. Detection of the low frequency adsorption will trigger the gate; however, in the event that store personnel are unable to prevent the theft from occurring, the ID of the products that have been stolen are more likely to be read than would be the case if the chip 10 was operating as a normal passive UHF RFID tag.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed:

1. A dual mode detection device comprising: a dual mode microchip including a logic circuit and a non-volatile memory, wherein the dual mode microchip has an electronic article surveillance (EAS) mode and a radio frequency identification (RFID) mode; an antenna operatively coupled to the microchip for operation of the RFID mode; a coil separate from the antenna operatively coupled to the microchip; and a capacitor, comprising a ferroelectric dielectric material is integrated into the microchip that resonates with the coil at a specific frequency wherein exceeding a breakdown voltage of the capacitor alters a state of a memory location in the non-volatile memory in which the capacitor and coil form a resonance circuit in which the capacitor and coil form a resonance circuit.

2. The dual mode detection device of claim 1, further comprising a control switch having anon-volatile state that controls the resonant condition of the coil such that it is either detected or not detected by an EAS gate.

3. The dual mode detection device of claim 2, wherein the control switch comprises a transistor connected across the capacitor such that when the switch is open circuit the EAS mode is operational, and when the switch is short circuit, the EAS mode is inhibited.

4. The dual mode detection device of claim 1, wherein the device operates at an ultra high frequency for performing the RFID and at a high frequency for performing the EAS mode.

5. The dual mode detection device of claim 4, wherein the dual mode microchip has an EAS enabled state and an EAS disabled state.

6. The dual mode detection device of claim 5, wherein the EAS enabled and disabled states are altered by a command from an RFID reader device to set a bit in non-volatile memory via an ultra high frequency interface to the microchip.

7. The dual mode detection device of claim 5, wherein the EAS enabled and disabled states are altered by increasing the level of a voltage signal applied across the coil above a threshold level to set a bit in non-volatile memory via a high frequency interface to the microchip.

8. The dual mode detection device of claim 1, further comprising a level detector on an input connector to the coil that sets the state of the EAS capability via the logic circuit.

9. The dual mode detection device of claim 1, further comprising a rectifier circuit that derives power for operation of the microchip from an ultra high frequency input signal.

10. The dual mode detection device of claim 9, wherein the rectifier circuit derives power for operation of the microchip from a combination of the ultra high frequency input signal and a signal present across the coil.

11. The dual mode detection device of claim 1, wherein the antenna operates at an ultra high frequency.

12. The dual mode detection device of claim 11, wherein the antenna comprises a dipole structure.

13. The dual mode detection device of claim 1, wherein electric power to operate the logic circuit is provided by an electrical connection from the coil to the microchip and is derived from a signal at a resonant frequency detected by the coil.

14. The dual mode detection device of claim 1, wherein the resonant frequency is 8.2 MHz.

15. The dual mode detection device of claim 1, wherein ferroelectric dielectric material provides a tunable capacitance.

16. A dual mode detection device comprising: a dual mode microchip including a logic circuit and a non-volatile memory, wherein the dual mode microchip has an electronic article surveillance (EAS) mode and a radio frequency identification (RFID) mode; an antenna operatively coupled to the microchip for operation of the RFID mode; a coil separate from the antenna operatively coupled to the microchip;
a capacitor comprising a ferroelectric dielectric material is integrated into the microchip that resonates the coil at a specific frequency and alters a state of a memory location in the non-volatile memory; and a control switch for changing an operating frequency of a combination of the coil and capacitor in which the capacitor and coil form a resonance circuit.

17. The dual mode detection device of claim 16, wherein the control switch comprises a transistor connected across the capacitor such that when the switch is open circuit the EAS mode is operational, and when the switch is short circuit, the EAS mode is inhibited.

18. The dual mode detection device of claim 16, further comprising a second capacitor to change the resonant frequency of the coil.

19. The dual mode detection device of claim 18, wherein the resonant frequency is 8.2 MHZ when the switch is in an off state and 4.1 MHz when the switch is in an on state.

20. The dual mode detection device of claim 19, wherein the device is detectable by an EAS gate when operating at a resonant frequency of 8.2 MHz and is not detectable when operating at a resonant frequency of 4.1 MHz.

21. A dual mode detection device comprising: a dual mode microchip including a non-volatile memory, wherein the dual mode microchip operates in an electronic article surveillance (EAS) mode at high frequency and in a radio frequency identification (RFID) mode at ultra high frequency;
    an antenna operatively coupled to the microchip for operation of the RFID mode;
    a structure operatively coupled to the microchip that operates as an antenna when the device is in RFID mode and as a coil when the device is in EAS mode wherein the structure is separate from the antenna;
    a capacitor integrated into the microchip that resonates the coil at a specific frequency and alters a state of a memory location in the non-volatile memory in which the capacitor and coil form a resonance circuit;
    an inductor that enables the structure to function as a ultra high frequency antenna that matches impedance to the microchip when the device is operated at ultra high frequencies; and
    a control switch for changing an operating frequency of a combination of the coil and capacitor.

22. A dual mode detection device comprising: a dual mode microchip including a non-volatile memory, wherein the dual mode microchip operates in an electronic article surveillance (EAS) mode at high frequency and in a radio frequency identification (RFID) mode at ultra high frequency;
    an antenna operatively coupled to the microchip for operation of the RFID mode;
    a structure operatively coupled to the microchip that operates as an antenna when the device is in RFID mode and as a coil when the device is in EAS mode wherein the structure is separate from the antenna;
    a capacitor integrated into the microchip that resonates the coil at a specific frequency and alters a state of a memory location in the non-volatile memory;
    an inductor that enables the structure to function as a ultra high frequency antenna that matches impedance to the microchip when the device is operated at ultra high frequencies;
    a control switch for changing an operating frequency of a combination of the coil and capacitor; and a rectifier circuit that derives power for operation of the microchip from a combination of the ultra high frequency input signal and a signal present across the coil.

* * * * *